No. 897,205. PATENTED AUG. 25, 1908.
A. HELLWIG.
APPARATUS FOR STIRRING AND FILTERING MASH.
APPLICATION FILED MAR. 18, 1907.
2 SHEETS—SHEET 1.
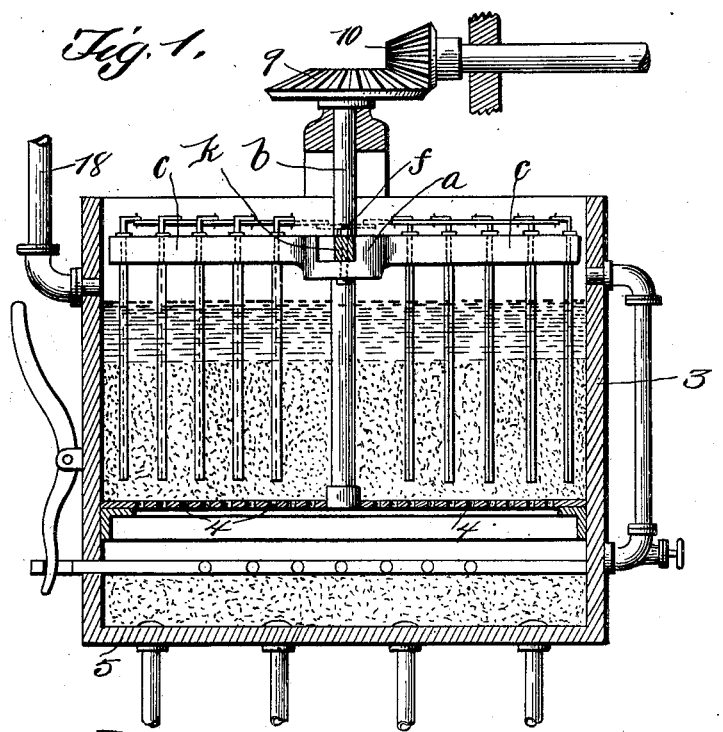
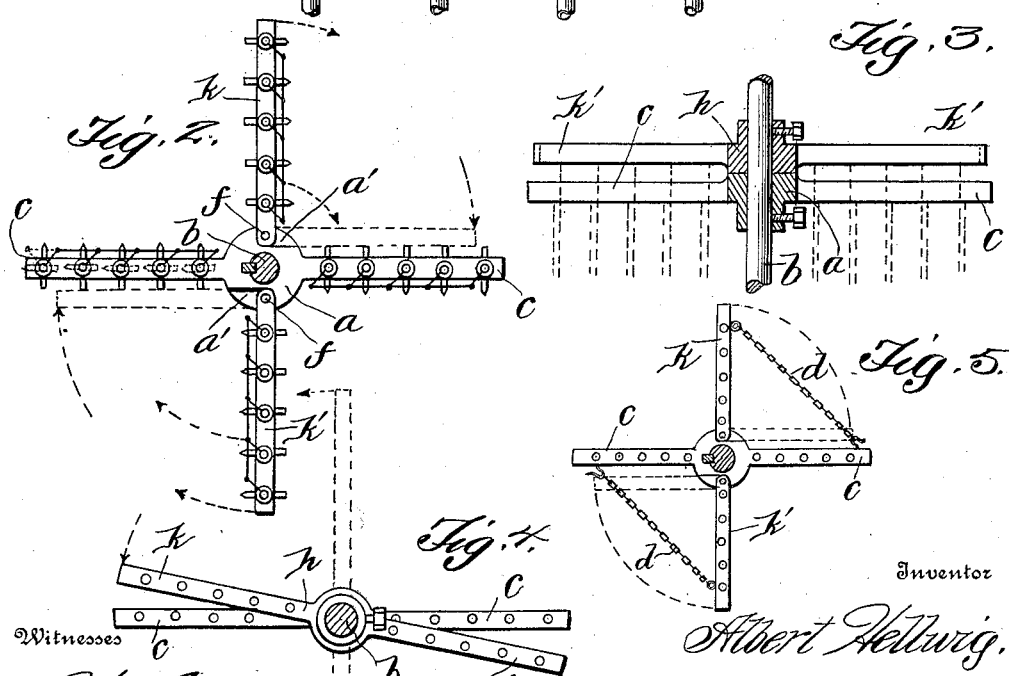

No. 897,205. PATENTED AUG. 25, 1908.
A. HELLWIG.
APPARATUS FOR STIRRING AND FILTERING MASH.
APPLICATION FILED MAR. 18, 1907.
2 SHEETS—SHEET 2.
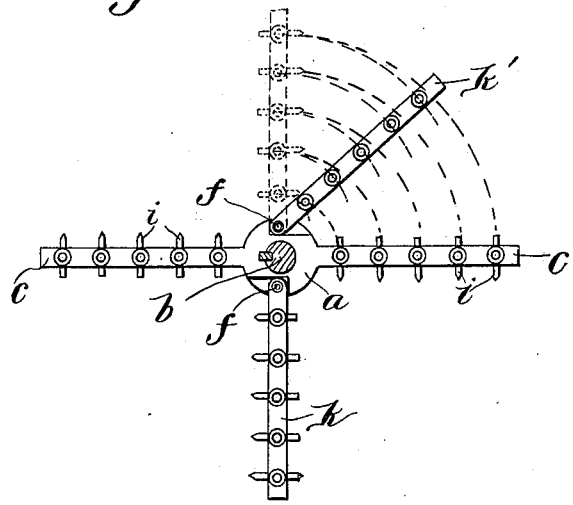
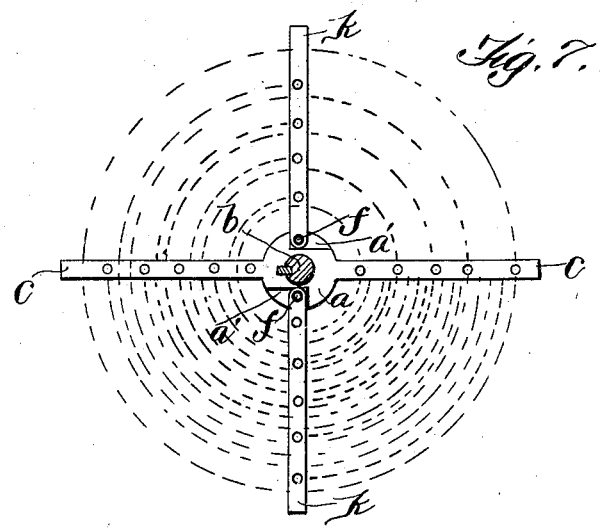
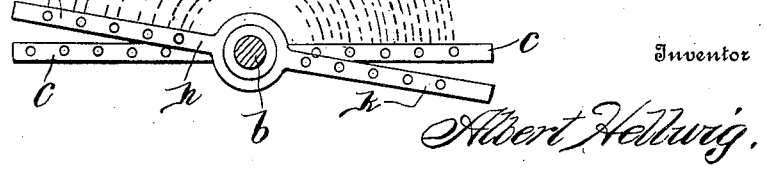

UNITED STATES PATENT OFFICE.

ALBERT HELLWIG, OF BELCHATOW, RUSSIA.

APPARATUS FOR STIRRING AND FILTERING MASH.

No. 897,205.   Specification of Letters Patent.   Patented Aug. 25, 1908.

Application filed March 18, 1907. Serial No. 363,130.

*To all whom it may concern:*

Be it known that I, ALBERT HELLWIG, brewery-possessor, a subject of the Emperor of Russia, residing at Belchatow, Russia, Gouvernement Petrikau, have invented certain new and useful Apparatus for Stirring and Filtering Mash, of which the following is a specification.

This invention is an improved apparatus for stirring and filtering mash, and has particular reference to the means for stirring the mash in the tub during the process of extracting the wort from the mash.

The invention is particularly designed for use in connection with the process of extracting the wort set forth in my application for patent Serial No. 325,266, filed July 9, 1906, in which process the mash is placed in a tub, and stirred in such manner that the layers of malt are agitated horizontally, but not displaced vertically, and at same time water is passed downward through the malt and the wort extracted. In carrying out this process, a clearing-vat has been employed in which sword-shaped blades are moved through the mash at a given distance from the sieve-bottom, a thin layer of mash remaining undisturbed on the sieve or perforated bottom and serving as a filter. It has been observed that this process may be considerably expedited by using a large number of blades on the stirrer-arms. These blades however should not be too near each other as in that case they could not cut through the malt and the latter would be carried along in lumps in front of the blades, while the process would be greatly affected by the vertical layers of the mash being mixed up. Therefore there exists a minimum limit of the distance between the blades on each arm; if the process is to be economically employed.

In order to have a great number of blades traversing the malt, the present invention provides stirrers with more than two arms.

In the accompanying drawings which illustrate the invention several modifications of such stirrers are shown. Figure 1 being a section through a clearing vat, showing a stirrer with four arms, of which two are fixed to the hub, and two are pivoted to the hub. Fig. 2 is a plan of the stirrer shown in Fig. 1. Fig. 3 is a side elevation of a modified form of stirrer, in which two pairs of arms are arranged above each other, each being movable on a separate hub and adjustable. Fig. 4 is a plan of the same arrangement. Fig. 5 shows a special mode of fixing or holding the folding arms by means of chains. Fig. 6 is a plan of the stirrer with four arms (Fig. 2) showing how by partly turning the folding arms the distance of the blades from the axis of rotation can be altered. Fig. 7 is a plan of a stirrer with four arms the blades being arranged alternating in a given manner. Fig. 8 is a plan of the design with the arms arranged crosswise adjustably above each other (Fig. 4), and here also the blades are arranged alternating.

Referring to Figs. 1, 2, and 5–7, of the drawings, 3 designates the mash-tub, having preferably a false sieve-bottom 4, above its own bottom 5. In the tub is a central shaft $b$, rotated by bevel gears 9, 10, and on said shaft is fixed a hub $a$, having oppositely extending rigid arms $c, c$, and intermediate the arms $c$, are opposite similar arms $k, k'$, which are pivoted at $f$, in recesses $a'$, in the hub $a$, so that arms $k, k'$, can be folded up against the arms $c$, as indicated in dotted lines in Fig. 5 of the drawings. The folding of the arms, or their distance apart, can be regulated by chains, as in Fig. 5.

As indicated in Figs. 3, 4 and 8, instead of pivoting the arms $k, k'$, to the hub $a$, a second similar hub $h$, carrying the arms $k, k'$, may be arranged on shaft $b$ above hub $a$.

In order to accelerate the filtration and washing out of the beer-wort by the process mentioned above, it is desirable to make a large number of blades pass at a certain but not too great speed through the mash. If the blades, which should not be too close together, were fixed in the known manner, as shown in Figs. 2, 4, and 5, so that on the stirrer being rotated only as many grooves are cut into the mash as there are blades on a radial arm, no improvement or acceleration of the filtration or extraction according to the above process would be obtained. In order however to obtain an acceleration of the filtration and a greater yield of wort by extraction, the blades are suitably arranged at the smallest permissible distances apart on the several arms, as shown in Fig. 7, while the blades on one arm are arranged so as to alternate with the blades on the preceding arm, so that on the stirrer being rotated the number of separate cuts in the mash is equal to the number of blades on one arm multiplied by the number of arms, as indicated in Fig. 7. The arms must be made to fold in order to allow of entering the vat.

By having the blades on the successive arms arranged as described, so that each blade cuts its own path, and does not follow in the path of a preceding blade, the aforementioned process of separating the wort, is greatly expedited. The desired disposition of the blades, may be accomplished in various ways. For instance the arm $k'$ may be moved to the position shown in Fig. 6. The said figure illustrates that by moving the folding arms the distance of the blades from the center of rotation is changed. If the arm $k'$ is fixed in its folded position to the arm $c$, it is possible to make the blades of this arm pass in other paths through the mash than the paths traversed by the blades of the rigid arm $c$.

An acceleration and improvement of the process may be obtained by arranging the blades alternately to each other on the arms in such a manner that, as illustrated in Fig. 7, with five blades on each arm at the first quarter of a revolution five cuts are made, at the second quarter ten cuts, at the third quarter fifteen cuts, and at the fourth quarter twenty cuts. When the stirrer is slowly rotated the mash is transsected by a number of cuts equal to the number of blades on one arm multiplied by the number of arms. The mash to be extracted is thus transsected at as large a number of places as possible, so that the separating process is considerably accelerated and the yield increased. Such alternation of the blades may be had both on stirrers with movable arms, according to Fig. 7, as also with arms adjustable crosswise over each other (Figs. 3, 4 and 8). In both instances the effect is the same. It is however necessary that the blades be arranged as much as possible in the line of the circular cuts they make in the mash, as if the blades were to turn round their own axes possibly the mash at the bottom of the vat might be whirled up, and the clearing process might be disturbed. The blades are preferably fixed to the arms in such manner as to be adjustable and fixable either singly or together.

Having described my invention what I claim as new and desire to secure by Letters Patent is:

1. In combination, a tub, a shaft therein, arms rigidly attached to said shaft, and intermediate arms adjustably attached to said shaft and adapted to be folded parallel with the fixed arms, all said arms being provided with a series of depending blades, the blades on the arms alternating, substantially as described.

2. In combination, a tub, a shaft therein, arms rigidly attached to said shaft, and intermediate arms pivotally attached to said shaft and adapted to be folded parallel with the fixed arms, said arms being provided with a series of depending blades, the blades on the several arms being arranged to alternate with blades on the other arms.

3. In an apparatus for separating wort from mash, the combination of a tub having a sieve-bottom, a central shaft, a hub attached to the shaft, arms fixed to the hub, intermediate arms pivoted to the hub, and blades attached to said arms, the blades on the pivoted arms alternating with the blades on the fixed arms.

In testimony whereof I have hereunto set my hand in the presence of two witnesses.

ALBERT HELLWIG.

Witnesses:
HENRY HASPER,
WOLDEMAR HAUPT.